US008010338B2

(12) United States Patent
Thörn (10) Patent No.: US 8,010,338 B2
(45) Date of Patent: Aug. 30, 2011

(54) DYNAMIC MODIFICATION OF A MESSAGING LANGUAGE

(75) Inventor: Ola Karl Thörn, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 898 days.

(21) Appl. No.: 11/563,320

(22) Filed: Nov. 27, 2006

(65) Prior Publication Data
US 2008/0126077 A1   May 29, 2008

(51) Int. Cl.
*G06F 17/20* (2006.01)
(52) U.S. Cl. .............. 704/8; 704/10; 704/246; 704/247; 704/251; 704/252
(58) Field of Classification Search .................. None
See application file for complete search history.

(56) References Cited

U.S. PATENT DOCUMENTS

| 2002/0004822 A1 | 1/2002 | Azuma | |
| 2003/0073451 A1* | 4/2003 | Kraft | 455/466 |
| 2003/0125927 A1* | 7/2003 | Seme | 704/3 |
| 2005/0108017 A1* | 5/2005 | Esser et al. | 704/277 |
| 2006/0119583 A1* | 6/2006 | Potera | 345/171 |
| 2006/0129680 A1* | 6/2006 | Hurst et al. | 709/228 |
| 2006/0227945 A1* | 10/2006 | Runge et al. | 379/88.05 |
| 2006/0247917 A1* | 11/2006 | Fux et al. | 704/9 |
| 2008/0065369 A1* | 3/2008 | Fux et al. | 704/8 |
| 2009/0170536 A1* | 7/2009 | Rang et al. | 455/466 |

FOREIGN PATENT DOCUMENTS

| EP | 1 480 420 A1 | 11/2004 |
| EP | 1 480 421 A1 | 11/2004 |

OTHER PUBLICATIONS

International Search Report and Written Opinion dated Oct. 26, 2007, 12 total pages.
International Preliminary Report on Patentability issued in corresponding international application No. PCT/IB2007/051971, mailed on Nov. 21, 2008, 9 pages.

* cited by examiner

*Primary Examiner* — Leonard Saint Cyr
(74) *Attorney, Agent, or Firm* — Snyder, Clark, Lesch & Chung, LLP (57) ABSTRACT

A method for dynamically modifying an outgoing message language includes receiving a message from a sender. A language associated with the received message is identified and an outgoing message language is automatically set to the identified language associated with the received message.

22 Claims, 7 Drawing Sheets

DYNAMIC MODIFICATION OF A MESSAGING LANGUAGE

TECHNICAL FIELD OF THE INVENTION

The invention relates generally to communications and, more particularly, to improving a messaging experience on a communication device.

DESCRIPTION OF RELATED ART

Communication devices, such as cellular telephones, personal digital assistants (PDAs), instant messaging (IM) clients, gaming systems, laptop and desktop computers, etc, have become increasingly versatile. For example, cellular telephones often include applications that enable users to exchange messages, such as text messages, e-mail messages, multi-media messages, etc. Such applications have made communication devices increasingly important to users.

In many instances, users of communication devices may conduct communication in more than one language. For example, a telephone user in Sweden may communicate with other users in English or in Swedish depending on the preferred language of either the sending party or the receiving party. In known messaging applications, a user's messaging language is typically set at either a default language, or a last used language regardless of the language that may be most appropriate for a given correspondence. In such messaging applications, users may modify the messaging language only manually through a serious of key presses and/or menu selections.

SUMMARY

According to one aspect, a method for dynamically modifying an outgoing message language includes receiving a message from a sender. A language associated with the received message is identified and an outgoing message language is automatically set to the identified language associated with the received message.

Additionally, the identifying a language associated with the received message further may include identifying an address book entry associated with the sender; determining whether the address book entry indicates a preferred language for use in messaging with the sender; and identifying the language associated with the received message as the preferred language.

Additionally, the identifying a language associated with the received message may include identifying a language used in a majority of previously sent messages to the sender; and identifying the language associated with the received message as the language used in the majority of previously sent messages.

Additionally, the identifying a language used in the majority of previously sent messages to the sender may include identifying the language used in the majority of previously sent messages to the sender when at least a predetermined number of messages have been previous sent to the sender.

Additionally, the identifying a language associated with the received message may include determining whether a predetermined percentage of terms in the received message are associated with a currently set outgoing message language; and identifying the language associated with the received message as the currently set outgoing message language when it is determined that the predetermined percentage of terms in the received message are associated with the currently set outgoing message language.

Additionally, the predetermined percentage may range from about 30% to about be 75%.

Additionally, the predetermined percentage may be about 50%.

Additionally, the identifying a language associated with the received message may include comparing the terms in the received message to at least one dictionary associated with a language other than the currently set outgoing message language; and determining whether a second predetermined percentage of terms in the received message match terms in a dictionary associated with a language other than the currently set outgoing message language; and identifying the language associated with the received message as the currently set outgoing message language when it is determined that the second predetermined percentage of terms in the received message match terms in the dictionary associated with a language other than the currently set outgoing message language.

Additionally, the at least one dictionary may be stored locally.

Additionally, the at least one dictionary may be stored remotely and accessed via a network.

Additionally, the identifying a language associated with the received message may include identifying terms in the received message that match terms in at least one frequently used word index associated with a language other than the currently set outgoing message language; and identifying the language associated with the received message as the language associated with the frequently used word index having a largest number of matching terms.

Additionally, the identifying a language associated with the received message may include identifying terms in the received message that match terms in at least one infrequently used word index associated with a language other than the currently set outgoing message language; and identifying the language associated with the received message as the language associated with the infrequently used word index having a smallest number of matching terms.

Additionally, the method may further include determining whether a dictionary associated with the language associated with the received message is currently supported; and retrieving the dictionary from a remote resource if the dictionary is not currently supported.

Additionally, the retrieving the dictionary from a remote resource may include downloading the dictionary from a service provider.

Additionally, the retrieving the dictionary from a remote resource may include downloading the dictionary from a server via a wireless network.

Additionally, the identifying a language associated with the received message may include comparing a syntax of the received message to at least one frequently used syntax pattern associated with a language other than the currently set outgoing message language; and identifying the language associated with the received message as the language associated with the syntax pattern best matching the syntax of the received message.

Additionally, the received message may be one of a text message, a multi-media message, an email message, an instant message, or a chat message.

According to another aspect, a mobile terminal may be provided. The mobile terminal may include a receiver configured to receive a message from a sending party. The mobile terminal may further include logic configured to identify a language associated with the received message; automatically set an outgoing message language to the identified language; and generate an outgoing message using the outgoing message language. The mobile terminal may also include a transmitter configured to transmit the outgoing message to a communication device associated with the sending party.

Additionally, the mobile device may further include a memory configured to store an address book including information associated with a plurality of contacts. The logic may be farther configured to determine whether the address book includes contact information associated with the sending party; determine whether the contact information associated with the sending party includes a preferred language when it is determined that the address book includes contact information associated with the sending party; and set the language associated with the received message as the preferred language when the contact information associated with the sending party includes the preferred language.

Additionally, the logic may be farther configured to determine a preferred messaging language based on messages previously sent to the sending party when it is determined that the contact information associated with the sending party does not include a preferred language.

Additionally, the preferred messaging language may be determined based on a language used in a majority of messages previously sent to the sending party.

Additionally, the logic may be further configured to match terms included in the received message to a plurality of dictionaries associated with languages other than a currently set messaging language; and set the language associated with the received message to a language associated with one dictionary in the plurality of dictionaries that includes a predetermined percentage of matching terms.

Additionally, the predetermined percentage may be range from about 30% to about 75%.

According to a further aspect, a computer-readable medium having stored thereon sequences of instructions is provided. The instructions, when executed by at least one processor, cause the at least one processor to receive a message from a sender; identify a language associated with the received message; and automatically configure an outgoing message language to the identified language associated with the received message.

Additionally, the instructions for causing the at least one processor to identify a language associated with the received message may further include instructions for causing the at least on processor to identify a language associated with the received message based on a comparison of terms included in the received message to at least one of a dictionary associated with a language other than a current outgoing message language, a frequently used word index, or an infrequently used word index associated with the language other than the current outgoing message language.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
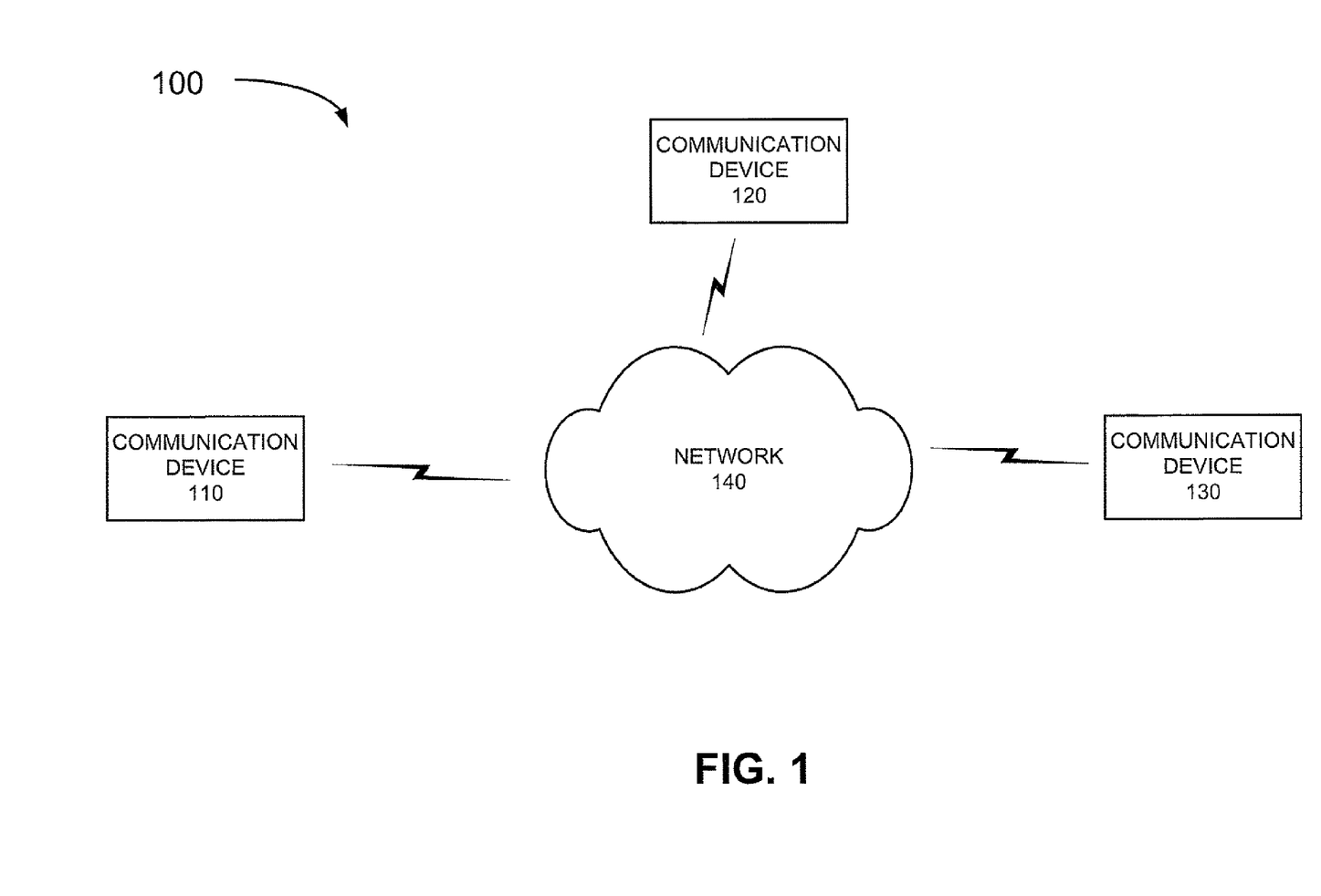
FIG. 1 is a diagram of an exemplary system in which methods and systems consistent with the invention may be implemented.

FIG. 1 is a diagram of an exemplary system 100 in which methods and systems consistent with the invention may be implemented. System 100 may include communication devices 110, 120 and 130 connected via network 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Communication devices 110-130 may each include any type of conventional device that is able to communicate via a network. For example, communication devices 110-130 may include any type of device that is capable of transmitting and receiving data (e.g., voice, text, images, multi-media data) to/from network 140. In an exemplary implementation, one or more of communication devices 110-130 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a thin client computer device configured to perform as an interface to another device over a computer network; and a conventional laptop and/or palmtop receiver or other appliance that includes a radiotelephone transceiver. Mobile terminals may also be referred to as "pervasive computing" devices.

In an alternative implementation, one or more of communication devices 110-130 may include any client device, such as a personal computer (PC), a laptop computer, a PDA, a web-based appliance, etc., that is able to transmit and receive data via network 140. Communication devices 110, 120 and 130 may communicate with each other over network 140 via wired, wireless or optical connections.

Network 140 may include one or more networks including a cellular network, a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, network 140 includes a cellular network that uses components for transmitting data to and from communication devices 110, 120 and 130. Such components may include base station antennas (not shown) that transmit and receive data from communication devices within their vicinity. Such components may also include base stations (not shown) that connect to the base station antennas and communicate with other devices, such as switches and routers (not shown) in accordance with known techniques.

Figure 2:
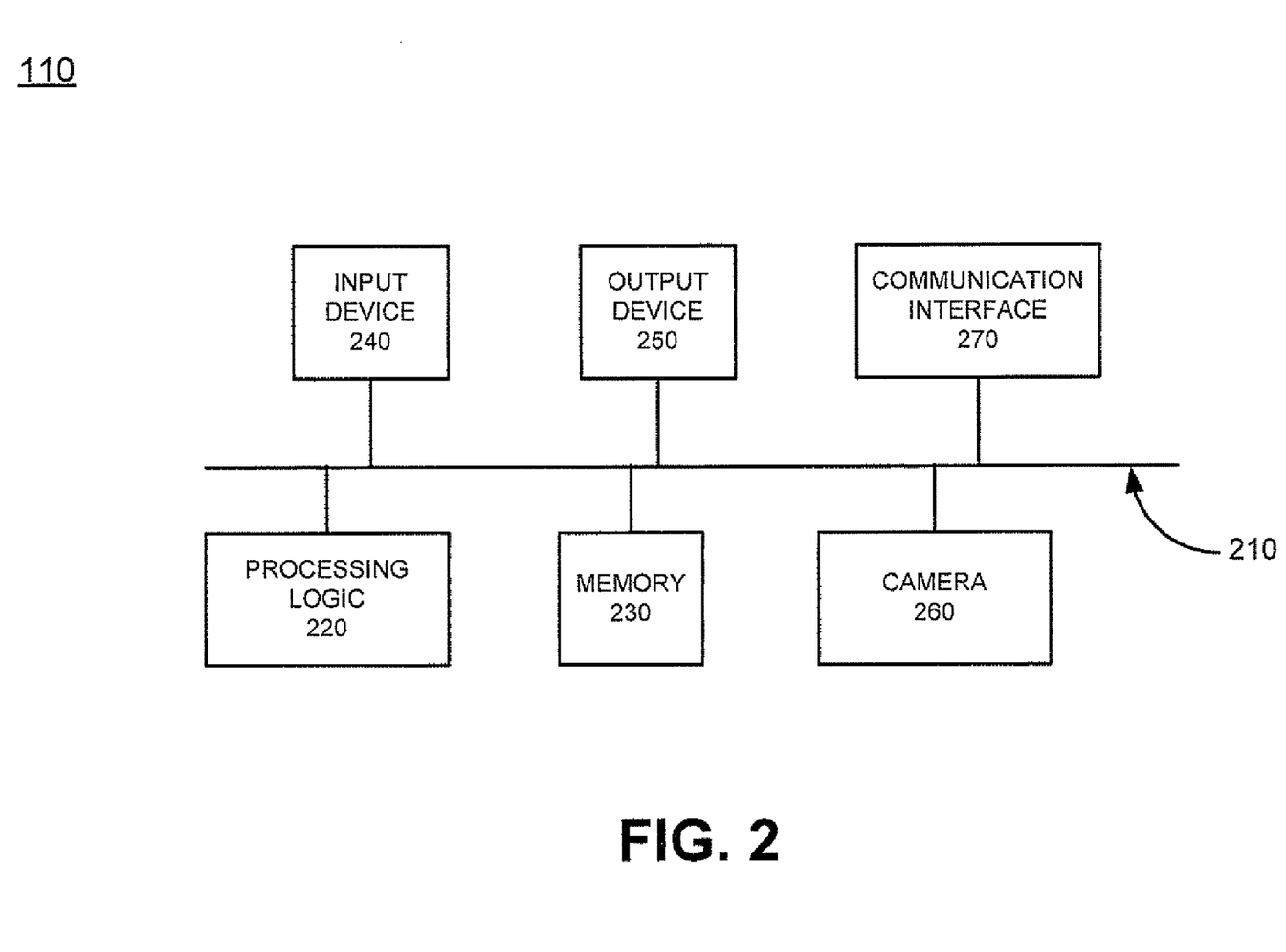
FIG. 2 is a diagram of an exemplary communication device of FIG. 1 according to an implementation consistent with the invention.

FIG. 2 is a diagram of communication device 110 according to an exemplary implementation consistent with the invention. It should be understood that communication devices 120 and 130 may include the same or similar elements and may be configured in the same or a similar manner. Communication device 110 may include bus 210, processing logic 220, memory 230, input device 240, output device 250, camera 260 and communication interface 270. Bus 210 permits communication among the components of communication device 110. One skilled in the art would recognize that communication device 110 may be configured in a number of other ways and may include other or different elements. For example, communication device 110 may include one or more power supplies (not shown). Communication device 110 may also include a modulator, a demodulator, an encoder, a decoder, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of communication device 110.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220

Input device 240 may include any mechanism that permits an operator to input information to communication device 110, such as a keypad, a microphone, a keyboard, a mouse, a pen, voice recognition and/or biometric mechanisms, a barcode reader or scanner, a visual gesture interpreting engine (incorporating, for example, a gyroscope, an accelerometer, etc), an optical character recognition (OCR) engine, a handwriting recognition mechanism, etc. Input device 240 may also include one or more buttons that allow a user to receive a menu of options via output device 250. The menu may allow the user to select various functions or modes associated with applications executed by communication device 110.

Output device 250 may include one or more conventional mechanisms that output information to the user, including a display, a printer, one or more speakers, etc. Output device 250 may also include a vibrator mechanism that causes communication device 110 to vibrate.

Camera 260 may include conventional camera elements that enable communication device 110 to take pictures. Camera 260 may store the pictures in, for example, memory 230 or in another memory.

Communication interface 270 may include any transceiver-like mechanism that enables communication device 110 to communicate with other devices and/or systems. For example, communication interface 270 may include a modem or an Ethernet interface to a LAN. Alternatively, communication interface 270 may include other mechanisms for communicating via a network, such as a wireless network. For example, communication interface 270 may include one or more radio frequency (RF) transmitters and receivers and/or transceivers for communicating via a wireless or cellular network 140.

Communication device 110, consistent with aspects described herein, may perform processing associated with receiving a text or multi-media message, instant message, email, or the like from one or more of communication devices 120 or 130 (or any other suitable communication devices) and automatically configuring a language selection or dictionary associated with a messaging interface within communication device 110 to correspond to a language associated with the received message. Details relating to this processing will be described below. Communication device 110 may perform these operations in response to processing logic 220 executing sequences of instructions contained in a computer-readable medium, such as memory 230. Such instructions may be read into memory 230 from another computer-readable medium via, for example, communication interface 270. A computer-readable medium may include one or more memory devices and/or carrier waves. In alternative embodiments, hard-wired circuitry may be used in place of or in combination with software instructions to implement processes consistent with the invention. Thus, implementations consistent with the invention are not limited to any specific combination of hardware circuitry and software.

Figure 3:
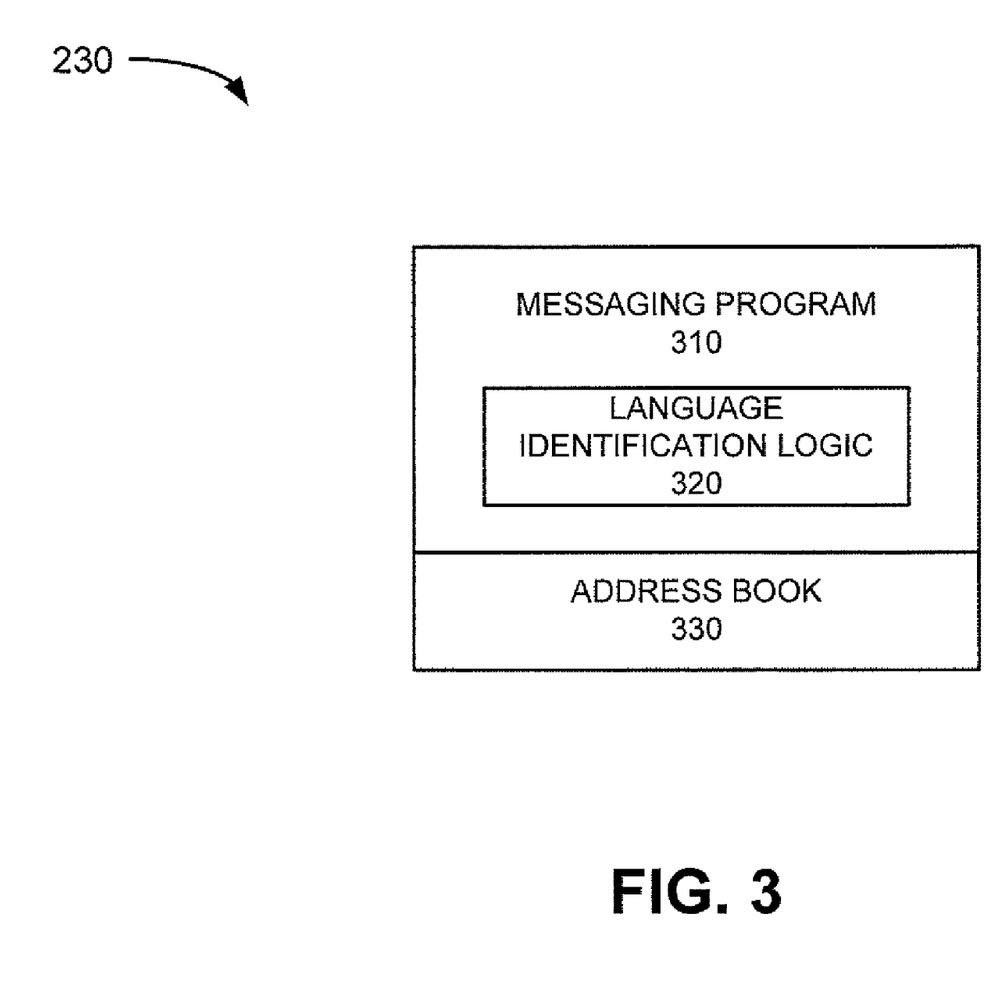
FIG. 3 is a an exemplary functional block diagram of components implemented in the communication device of FIG. 2 according to an implementation consistent with the invention.

FIG. 3 is one implementation of an exemplary functional block diagram of components implemented in communication device 110 of FIG. 2, such as in memory 230. Referring to FIG. 3, memory 230 may include a messaging program 310 including language identification logic 320 and an address book 330. Messaging program 310 may include any type of messaging program used to transmit and receive messages to/from other devices, such as communication devices 120 and 130. For example, messaging program 310 may include a multimedia message service (MMS) based program, a short message service (SMS) based program, an instant messaging (IM) based program, an e-mail program, or another application program that allows communication device 110 to communicate with other devices. Additionally, messaging program 310 may include a video messaging or video conference application configured to receive audio and video data from another communication device.

Address book 330 may be used to store contact information for a number of contacts. Typical information may include a name, a telephone number (or other contact identifier), a picture, an assigned ring tone, etc. As will be described more completely below, contact entries in address book 330 may also include a preferred language element or tag.

In an exemplary implementation, messaging program 310 may include language identification logic 320. Language identification logic 320 may examine received messages and determine a likely language associated therewith. This may be done through contact or recipient tagging, textual or syntax analysis of the received messages, analysis of a voice or image received with the received messages.

Figure 4:
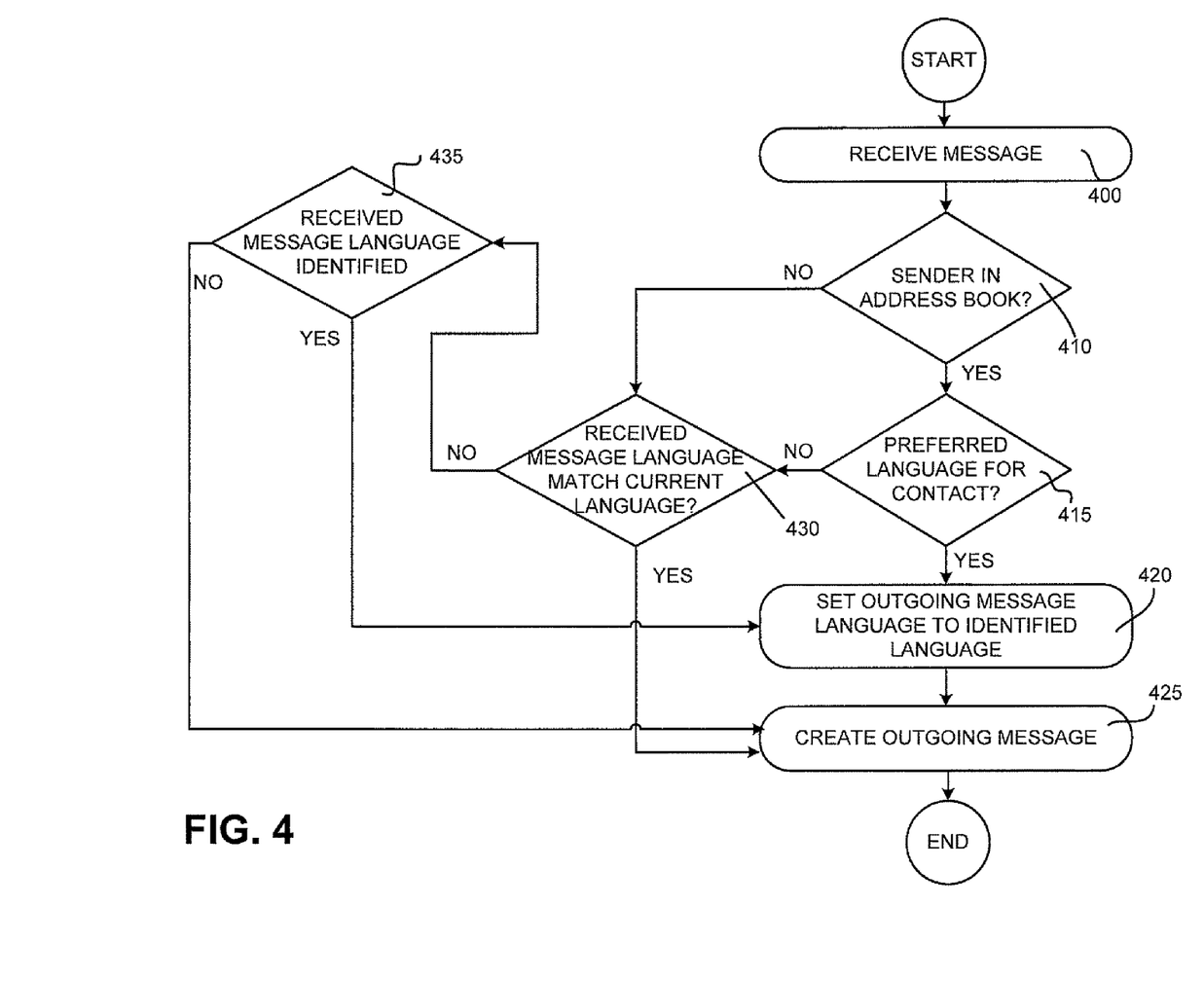
FIGS. 4-7 are flow diagrams illustrating exemplary processing by communication devices consistent with the invention.

Upon receipt of a user selection to reply to a message, messaging program 310 may configure a language or dictionary associated with the message to correspond to the identified language. In another implementation, contact entries stored in address book 330 and associated with a received message may include a language or dictionary tag or element associated therewith. In this implementation, subsequent messages to said contact would be generated using the associated language or dictionary. By facilitating automatic configuration of a messaging interface to correspond to individual contacts or correspondence scenarios, users are not required to manually configure the interface, thereby enhancing the overall messaging experience.

Exemplary Processing FIG. 4 is a flow diagram illustrating exemplary processing by communication devices, such as communication device 110, for generating a message in the manner described herein. Processing may begin upon receipt of a message by messaging program 310 (act 400). Communication device 110 may then receive a request to initiate an outgoing message in response to the received message. As described above, the received message may be any type of message, such as a text message or multimedia message. Language identification logic 320 may determine whether a sender of the received message matches a contact stored in address book 330 (act 410). As is known, a sender's identification may be based on a contact number (e.g., a telephone number) from which a call or message is received. If the sender matches a contact, it may then be determined whether a preferred language has been associated with the contact (act 415).

In one implementation consistent with the aspects described herein, the determination of whether a preferred language has been established may include determining whether the contact's entry in address book 330 includes a discrete language tag designating a preferred language or dictionary to be used when generating messages destined for the contact. In another implementation, language identification logic 320 may calculate a language preference based on messages previously sent to the contact. In one embodiment, the language used in creating a majority of messages to the contact may be associated with the contact in address book 330 as a preferred language. In this manner, a language preference associated with a contact may change over time based upon actual sent messages.

When it is determined that a preferred language has been associated with the contact from which the message was received, a language or dictionary for the outgoing message may be automatically set to match the preferred language (act 420). In some instances, the preferred language may already match the previously set or default language for messaging on communication device 110. In this case, no modification to the language or dictionary may be necessary.

However, if the current language or dictionary does not match the identified preferred language, the language for the outgoing message may be automatically changed to the identified preferred language. In one implementation, a confirmation message or confirmation request message may be displayed to the user indicating the change in messaging language. The user may be asked to confirm the change in language.

Once the outgoing messaging language has been set, message creation may continue (act 425). In one implementation, message creation may include continuing a message dialogue, such as with a chat or IM application.

When it is determined that either a preferred language has not been associated with the contact from which the message was received, or that the sender of the received message is not found in address book 330, it may be determined whether the language of the received message matches the currently set messaging language in communication device 110 (act 430).

In one implementation, such a determination may be made by comparing the words contained in the received message to a dictionary associated with the currently set language. In addition to complete words, word stems or individual characters may be examined. For example, if a majority of the words (or portions of words) included in the message are found in the current dictionary, then the message is presumed to be written in the currently set language. However, if less than a majority of the words are found in the current dictionary, the message is presumed to be written in a language other than the currently set language.

In another implementation, determining whether the language of the received message matches the currently set language may be done by identifying words in the received message matching an index of frequently used words for the currently set language. By restricting a language analysis to only a predetermined index of terms, language determination may be more efficiently made in communication device 110. In yet another implementation, language determination may be accomplished by comparing message terms with an index of infrequently used words associated with the currently set language.

When it is determined that the received message language matches the currently set messaging language, no language setting is changed and the process continues to act 425 for continued outgoing message creation. However, when it is determined that the received message language does not match the currently set messaging language, a language associated with the received message may be identified (act 435). However, if no language can be identified, processing may continue at act 425 using the default or currently selected language.

Figure 5:
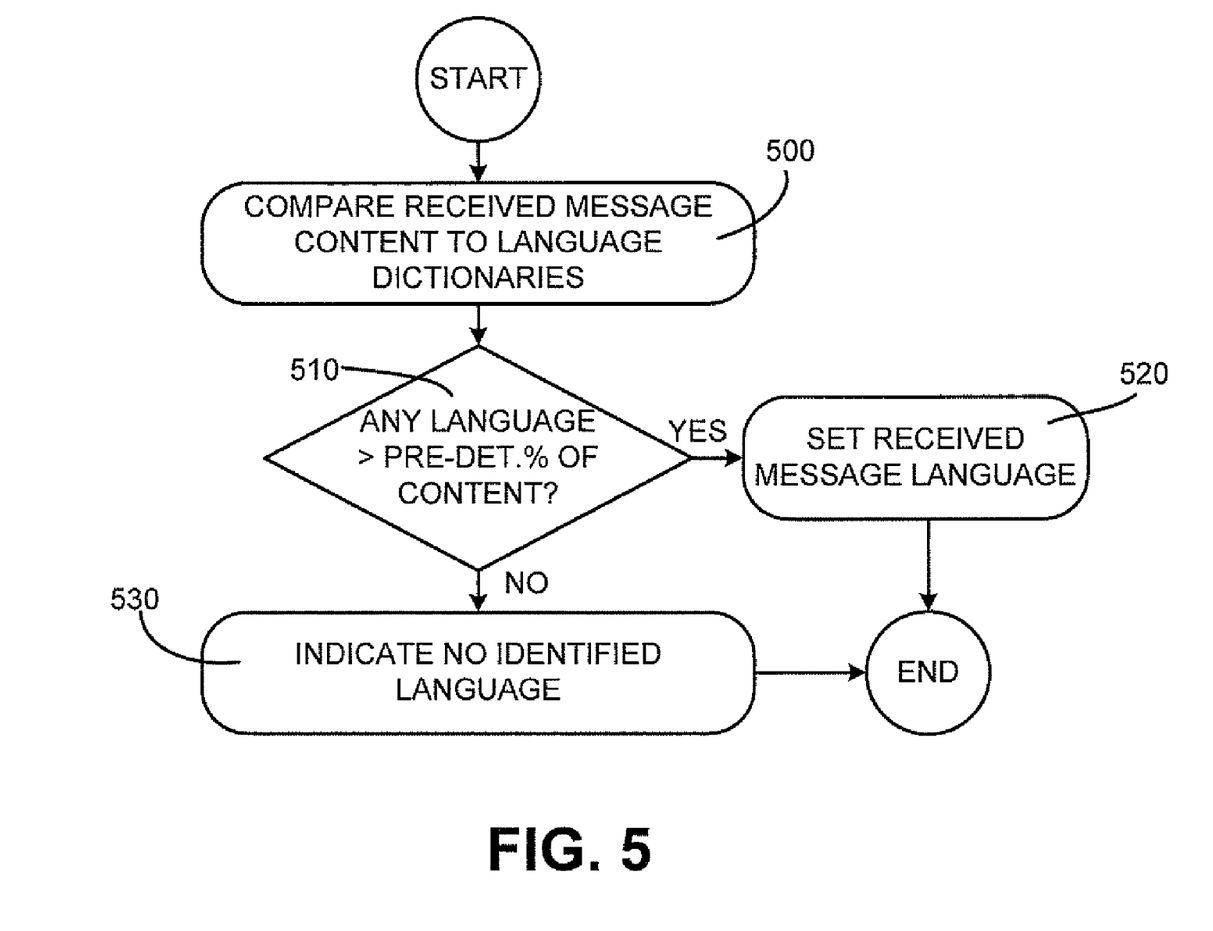

FIG. 5 is a flow diagram illustrating exemplary processing for determining a language associated with a received message. Initially, processing logic 220 may compare the contents of the received message to each of a number of dictionaries associated with different languages and stored in communication device 110 (e.g., in memory 230) (act 500). Next, processing logic 220 may determine if any language dictionary includes more than a predetermined percentage (e.g., 50%, 30%, etc.) of the words found in the received message (act 510). In one implementation, the predetermined percentage may be between about 35% and about 75%. If so, processing logic 220 may set the language associated with the received message to the identified language (act 520). If not, a received message language may not be identified (act 520). In this case, the default language may be used.

Figure 6:
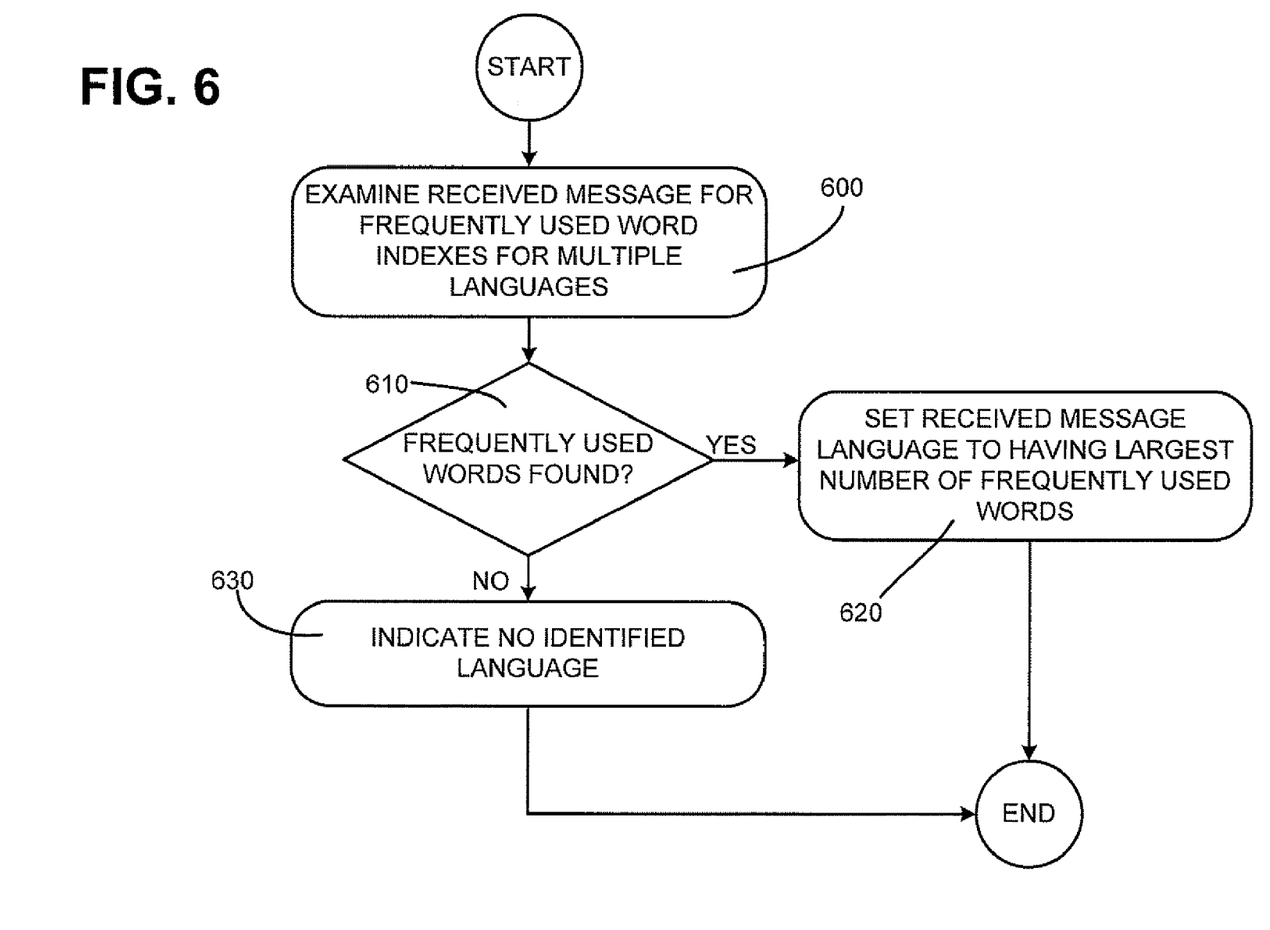

FIG. 6 is a flow diagram illustrating alternative exemplary processing for determining a language associated with a received message. In this implementation, processing logic 220 may examine the received message for frequently used words associated with a number of languages (act 600). In another implementation, language determination may be accomplished by comparing message terms in the received message for infrequently used words associated with the languages. Processing logic 220 may then determine whether any frequently used words have been identified (act 610) and, if so, the language associated with the received message may be identified as the language having the largest number of frequently used words (or, alternative, the smallest number of infrequently used words) (act 620). If no frequently used words are identified (or less than a predetermined number of them), no other language may be identified (act 630). Alternatively, each frequently used word may be provided with a ranking based on its relative frequency or uniqueness to its associated language. A total ranking for each language may be determined for the received message, where the total ranking is a cumulative ranking combining the rankings associated with each included frequently used word. The language associated with the message may be identified as the language associated with the highest ranking. In this implementation, a ranking meeting at least a predetermined threshold may be required prior to making or suggesting a dictionary or language change.

Figure 7:
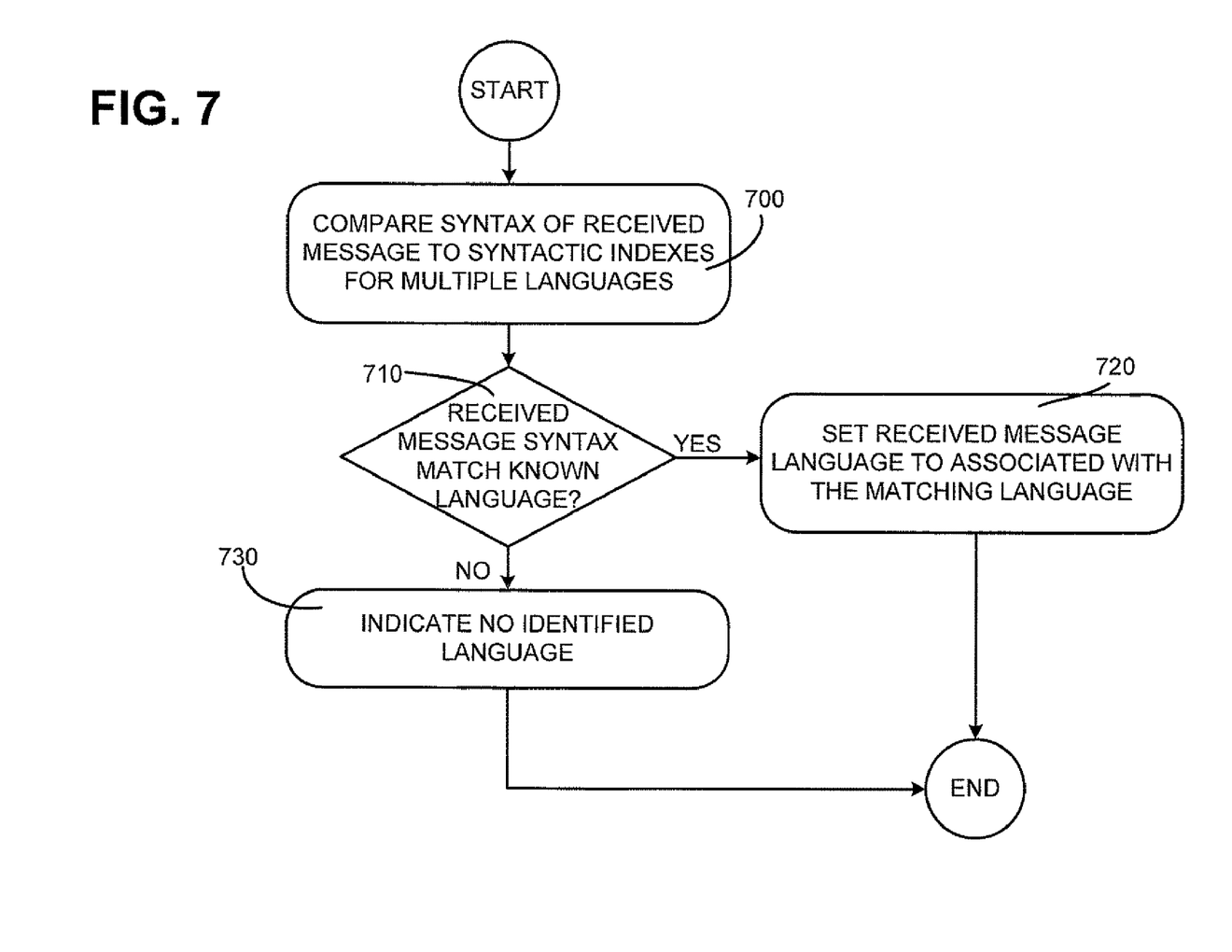

FIG. 7 is a flow diagram illustrating other exemplary processing for determining a language associated with a received message. In this implementation, a syntax of the received message may be examined and compared to known statistical syntax patterns to faciliate identification of the message language (act 700). A message's syntax may be understood to define "patterned relations" between the words in the message. Several different techniques have been proposed to analyze document syntax in an effort to either classify the document or translate the document.

For example, statistical semantics uses statistical patterns of human word usage to identify meaning from a potentially ambiguous collection of words and phrases by examining target words in relation to context words. Latent semantic analysis uses a term-document matrix to describe occurrences of terms and concepts based on a large corpus of text. Each of these concepts as well as others may be used to enable machine or automatic translation of text from one language to another. By enabling information about a language from a syntax associated with a text, potentially ambiguous distinctions between languages may be reduced.

Regardless of the manner of analysis, processing of act 700 may include comparison of a message's terms and syntax elements (e.g., context terms, term-document matrix, etc.) to those associated with known languages. The known syntax elements may be stored locally or remotely in a manner similar to that described above with respect to the language dictionaries. Processing logic 220 may then determine whether the received message matches a syntax uniquely associated with any of the supported languages (act 710). If so, processing logic 220 may set the language of the received message to the identified language (act 720). Otherwise, no language may be identified (act 730).

In a case of an audio or video message or conference, language identification may include may include analyzing the received voice and/or video and determining a language being spoken through speech analysis and/or image analysis. For example, voices in the received audio may be analyzed and transcribed and a language determination may be made based on the transcription. In a video embodiment, the received image may be examined for language identifying information, such as lip movements and/or sign language.

In each case, if a language associated with the received message has been identified, the language or dictionary associated with the outgoing reply message may be set to the identified language (FIG. 4, act 420). Processing may then continue to act 425 for continued outgoing message creation. However, if no supported language is identified in act 435, the dictionary may remain set to the current language or dictionary and the process may continue directly to act 425.

In some implementations, prior to setting an outgoing message language to a language other than the currently set language (e.g., act 420), the user may be queried by communication device 110 to confirm the change.

As described above, in one implementation, language identification for received messages may include examining frequently used word or syntax patterns for a number of different languages. Although each index may be associated with a language or dictionary associated with communication device 110, it may also be possible to store indexes relating to languages that are not currently supported by communication device 110. That is, the dictionaries associated with some of the stored indexes may not be stored on communication device 110. In this instance, when a received message language is determined to be a non-supported language, the user may be queried as to whether he/she wishes to download or otherwise retrieve or review a dictionary associated with the non-supported language from a remote resource (e.g., a service provider, carrier, online store, Internet server, etc.). In one implementation, a dictionary may be stored remotely and merely accessed in generated messages (e.g., when the communication device is a thin client). In this implementation, it is not necessary to download or otherwise retrieve the contents of a non-supported language dictionary.

In addition, in one implementation, dictionary data may be stored on other communication devices and may be reviewable or retrievable based on a local or mesh network connecting two or more devices. Alternatively, communication device 110 may retrieve dictionary or index data from other than wireless or local networks, such as, for example, a satellite network connection.

Additional implementations consistent with aspects described herein may use additional message describing information such as word length or message type (e.g., Unicode, GSM, etc.) in determining a language of a received message. Additionally, picture or audio messages may be examined using character or photo recognition logic to identify or determine location or language information for a received multi-media message.

By simplifying the language/dictionary modification process when generating outgoing or responsive messages, the above-described processing substantially enhances the overall messaging experience for multi-lingual users. Furthermore, by accurately identifying the language associated with a received message, the user is not required to manually indicate or select a language for a responsive message. Such functionality may ease user frustration and increase revenue associated with the receipt and transmission of messages.

CONCLUSION

Implementations consistent with the aspects described herein enable dynamic modification of a messaging language or dictionary based on a language associated with a received message or with a sender of the received message. Such processing enhances a messaging experience by eliminating the need for a user to affirmatively modify a language for each outgoing message.

The foregoing description of the embodiments of the invention provides illustration and description, but is not intended to be exhaustive or to limit the invention to the precise form disclosed. Modifications and variations are possible in light of the above teachings or may be acquired from practice of the invention.

Further, while series of acts have been described with respect to FIGS. 4-7, the order of the acts may be varied in other implementations consistent with the invention. Moreover, non-dependent acts may be performed in parallel.

It will also be apparent to one of ordinary skill in the art that aspects of the invention, as described above, may be implemented in, for example, computer devices, cellular communication devices/systems, methods, and/or computer program products. Accordingly, the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method performed in a communication device, the method comprising:
    receiving, by an interface of the communication device and via a network, a message from a sender, where the message is in a first language;
    determining, by one or more devices of the communication device, whether an address book associated with the communication device includes contact information associated with the sender;
    determining, by the one or more devices when the address book includes the contact information, whether the contact information designates a particular language associated with the sender;
    calculating, by the one or more devices when the contact information does not designate a particular language and when at least a predetermined number of messages have been previously sent to the sender, a language preference associated with a second language, where the second language is used in a majority of the messages previously sent, from the communication device, to the sender;
    associating, by the one or more devices and in response to calculating the language preference, the language preference with the contact information, where associating the language preference with the contact information associates the second language with the sender;
    determining, by the one or more devices when the address book does not include the contact information and when fewer than the predetermined number of messages have been previously sent to the sender, whether the first language matches a current outgoing messaging language;
    performing, by the one or more devices when the first language does not match the current outgoing messaging language, a language analysis of only a portion of the received message to identify the first language;
    automatically setting, by the one or more devices, an outgoing messaging language to the designated particular language, the identified second language, or the identified first language; and
    creating, by the one or more devices, an outgoing message to the sender, using the set messaging language.

2. The method of claim 1, where determining whether the first language matches the current outgoing messaging language, further comprises:
    determining whether a predetermined percentage of terms in the received message are associated with the current outgoing messaging language; and
    identifying the first language as the current outgoing messaging language when it is determined that the predetermined percentage of terms in the received message are associated with the current outgoing messaging language.

3. The method of claim 2, where the predetermined percentage comprises between about 35% and about 75%.

4. The method of claim 3, wherein where the predetermined percentage comprises about 50%.

5. The method of claim 2, where determining whether the first language matches the current outgoing messaging language, further comprises:
    comparing the terms in the received message to at least one dictionary associated with a language other than the current outgoing messaging language;
    determining whether a second predetermined percentage of terms in the received message match terms in a dictionary associated with a language other than the current outgoing messaging language; and
    identifying the first language as the current outgoing messaging language when it is determined that the second predetermined percentage of terms in the received message match terms in the dictionary associated with a language other than the current outgoing messaging language.

6. The method of claim 5, where the at least one dictionary is stored locally.

7. The method of claim 5, where the at least one dictionary is stored remotely and accessed via a network.

8. The method of claim 1, where determining whether the first language matches the current outgoing messaging language, further comprises:
    identifying terms in the received message that match terms in at least one frequently used word index associated with a language other than the current outgoing messaging language; and
    identifying the first language as the language associated with the frequently used word index having a largest number of matching terms.

9. The method of claim 8, further comprising:
    determining whether a dictionary associated with the first language is currently supported; and
    retrieving the dictionary from a remote resource if the dictionary is not currently supported.

10. The method of claim 9, where retrieving the dictionary from the remote resource includes downloading the dictionary from a service provider via the network.

11. The method of claim 9, where retrieving the dictionary from the remote resource includes downloading the dictionary from a server via a wireless network.

12. The method of claim 1, where determining whether the first language matches the current outgoing messaging language, further comprises:

identifying terms in the received message that match terms in at least one infrequently used word index associated with a language other than the current outgoing messaging language; and identifying the first language as the language associated with the infrequently used word index having a smallest number of matching terms.

13. The method of claim 1, where the determining whether the first language matches a current outgoing messaging language, further comprises:

comparing a syntax of the received message to at least one syntax pattern associated with a language other than the current outgoing messaging; and identifying the first language as the language associated with the syntax pattern best matching the syntax of the received message.

14. The method of claim 1, where the received message comprises at least one of a text message, a multi-media message, an email message, an instant message, or a chat message.

15. A communication device comprising:

a receiver to receive, via a network, a message from a sender, where the message is in a first language;

a memory storing instructions;

a processor to execute the instructions to:

determine whether an address book associated with the communication device includes contact information associated with the sender, determine, when the address book includes the contact information, whether the contact information designates a particular language associated with the sender, calculate, when the contact information does not designate a particular language and when at least a predetermined number of messages have been previously sent to the sender, a language preference associated with a second language, where the second language is used in a majority of the messages previously sent, from the communication device, to the sender, associate, in response to calculating the language preference, the language preference with the contact information, where associating the language preference with the contact information associates the second language with the sender;

determine, when the address book does not include the contact information and when fewer than the predetermined number of messages have been previously sent to the sender, whether the first language matches a current outgoing messaging language, and perform, when the first language does not match the current outgoing messaging language, a language analysis of only a portion of the received message to identify the first language, automatically set an outgoing messaging language to the designated particular language, the identified second language, or the identified first language associated with the received message; and a transmitter to send an outgoing message, to the sender, using the set messaging language.

16. The communication device of claim 15, where the processor, when determining whether the first language matches the current outgoing messaging language, is further to:

determine whether a predetermined percentage of terms in the received message are associated with the current outgoing messaging language; and identify the first language as the current outgoing messaging language when it is determined that the predetermined percentage of terms in the received message are associated with the current outgoing messaging language.

17. The communication device of claim 16, where the processor, when determining whether the first language matches the current outgoing messaging language, is further to:

compare the terms in the received message to at least one dictionary associated with a language other than the current outgoing messaging language;

determine whether a second predetermined percentage of terms in the received message match terms in a dictionary associated with a language other than the current outgoing messaging language; and identify the first language as the current outgoing messaging language when it is determined that the second predetermined percentage of terms in the received message match terms in the dictionary associated with a language other than the current outgoing messaging language.

18. The communication device of claim 15, where the processor, when determining whether the first language matches the current outgoing messaging language, is further to:

identify terms in the received message that match terms in at least one frequently used word index associated with a language other than the current outgoing messaging language; and identify the first language as the language associated with the frequently used word index having a largest number of matching terms.

19. The communication device of claim 15, where the processor, when determining whether the first language matches the current outgoing messaging language, is further to:

identify terms in the received message that match terms in at least one infrequently used word index associated with a language other than the current outgoing messaging language; and identify the first language as the language associated with the infrequently used word index having a smallest number of matching terms.

20. The communication device of claim 15, where the processor, when determining whether the first language matches the current outgoing messaging language, is further to:

compare a syntax of the received message to at least one syntax pattern associated with a language other than the current outgoing messaging; and identify the first language as the language associated with the syntax pattern best matching the syntax of the received message.

21. The communication device of claim 15, where the received message comprises one of a text message, a multi-media message, an email message, an instant message, or a chat message.

22. A non-transitory computer-readable storage device storing computer-readable instructions that, when executed by one or more processors, cause a communication device to:

receive, via a network, a message from a sender, where the message is in a first language;

determine whether an address book associated with the communication device includes contact information for the sender;

determine, when the address book includes the contact information, whether the contact information designates a particular language associated with the sender;

calculate, when the contact information does not designate a particular language and when at least a predetermined number of messages have been previously sent to the sender, a language preference associated with a second language, where the second language is used in a majority of the messages previously sent, from the communication device, to the sender;

associate, in response to calculating the language preference, the language preference with the contact information, where associating the language preference with the contact information associates the second language with the sender;

determine, when the address book does not include the contact information and when fewer than the predetermined number of messages have been previously sent to the sender, whether the first language matches a current outgoing messaging language;

perform, when the first language does not match the current outgoing messaging language, a language analysis of only a portion of the received message to identify the first language;

automatically set an outgoing messaging language to the designated particular language, the identified second language, or the identified first language; and send an outgoing message, to the sender, using the set outgoing messaging language.

\* \* \* \* \*